Feb. 9, 1937.   C. E. HOOVER   2,070,336
BATTERY POST AND CABLE CONNECTION
Filed Oct. 3, 1935
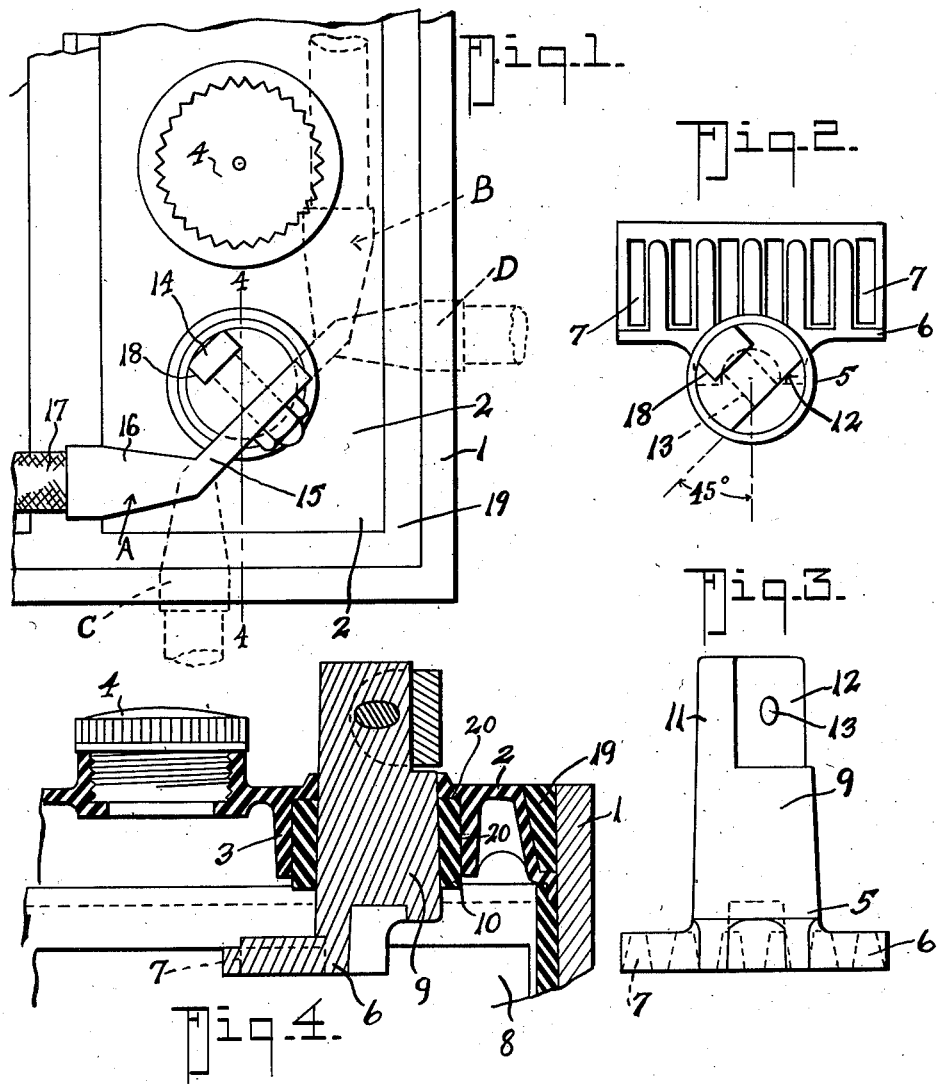
Inventor
CHARLES E. HOOVER
By Albert B. Dieterich
Attorney Patented Feb. 9, 1937

2,070,336

UNITED STATES PATENT OFFICE 2,070,336

BATTERY POST AND CABLE CONNECTION

Charles E. Hoover, Lancaster, Pa.

Application October 3, 1935, Serial No. 43,421

3 Claims. (Cl. 173—259)

My invention relates to storage batteries and it especially has relation to the terminal posts thereof and means to connect a cable thereto.

Primarily, the invention has for its object to provide a battery post of such construction as to receive and hold a bolt against turning and having a bolt hole in the post, the post also having a flat surface on one side to enable the securing of a flat wire terminal element to the post in a quick and efficient way, the flat surface lying in a plane making an angle of approximately 45° to the planes of the sides and ends of the battery box.

Further, it is an object so to construct a battery post and cable terminal end so that the same may be made of like material to prevent the connection being eaten up by corrosion.

Further, it is an object to provide a cable end to cooperate with the post in a manner so as to obtain a full surface contact at all times without using shims, thus reducing service to the minimum.

A further object is to provide a battery post and cable terminal combination whereby the cable end may be passed in any desired direction with a clearance of all parts of the battery box, including handles where such exist.

A further object is to provide a cable terminal member of such construction that it is only necessary to have one type of cable terminal for all purposes.

Other objects will in part be obvious and in part be pointed out hereinafter.

To the attainment of the aforesaid objects and ends the invention still further resides in the novel details of construction, combination and arrangement of parts, all of which will be first fully described in the following detailed description and then be particularly pointed out in the appended claims, reference being had to the accompanying drawing, in which:

Figure 1 is a plan view of a portion of a battery with my invention applied.

Figure 2 is a plan view of the battery post, per se.

Figure 3 is an elevation of the same.

Figure 4 is a section substantially on the line 4—4 of Figure 1.

In the drawing, in which like numerals of reference indicate like parts in all of the figures, 1 represents the battery box, 2 the lid of the cell, 3 the coniform neck of the lid and 4 the filler cap.

The battery post projects through the coniform neck of the lid and comprises a base part 5, a plate-connecting grid 6 having dove-tail portions 7 and projecting upwardly from the base part 5 a coniform body 9 which is surrounded by a rubber ring gasket 10 held compressed by the neck 3 to prevent leakage of electrolyte or escape of fumes.

Projecting upwardly from the body 9 is the head end 11 of the battery post. The head of the post is provided with a flat face 12 against which the cable terminal eye end 15 is clamped by a bolt and nut 14. The head 11 is provided with a bolt hole 13 and a bolt head receiving groove 18 in which the head of the bolt 14 is held against turning. The face 12 lies in a plane making an angle of approximately 45° to the sides and ends of the battery box 1 and the plates 8.

The cable terminal member comprises an eye 15 and a socket 16, the latter extending at an angle approximately 45° to the plane of the eye portion 15. The cable 17 is secured to the socket 16 by solder or in any other desired way.

It will be seen from an inspection of Figure 1, that with my invention it is possible to couple the cable to the battery post in any of a number of positions, see dotted lines B, C and D in Figure 1, also full lines A in that figure.

Furthermore, the cable terminal end is adjustable on the axis of the bolt to any position in a vertical plane above the horizontal.

Either face of the terminal eye 15 may be laid against the battery post face 12 as may be found desirable, it being understood that the opposite faces of the eye 15 are parallel.

It will be seen that with my construction it is possible to take care of cables of varying lengths and positions in the machine being serviced all without the use of shims or other attachments, and without the necessity of bending the cables at angles to get around projections, such as battery handles, filling caps, etc.

Furthermore in virtue of the construction shown and described the cable terminal may be made of lead or lead alloy and thus the metals in contact are of the same polarity and no electrolytic action will take place between them. Furthermore fumes and liquids will not corrode the cable terminal any more than the battery terminal and hence an accumulation of oxide deposits will not affect the conductivity and efficiency of the device.

Insofar as this application may contain common subject-matter with that filed by me November 14, 1933, Serial No. 697,986 the present one is a continuation thereof.

From the foregoing description, taken in connection with the accompanying drawing, it is thought the complete construction, operation and advantages of my invention will be readily understood by those skilled in the art.

What I claim is:

1. In a storage battery wherein is provided a box, the walls of which are at right angles to one another, a battery plate terminal post extending above the box and having a flat side the plane of which lies at an angle of approximately 45° to the sides of the box, a bolt hole passing through the flat faced portion of the post, all being arranged substantially for the purposes described.

2. In a storage battery wherein is provided a box, the walls of which are at right angles to one another, a battery plate terminal post extending above the box and having a flat side the plane of which lies at an angle of approximately 45° to the sides of the box, a bolt hole passing through the flat faced portion of the post, in combination with a cable terminal comprising a cable socket and a flat faced apertured extension, said extension projecting from the socket's axis to lie in a plane making an angle of approximately 45° with said axis, and a bolt with nut passing through said post and said flat faced extension for the purposes described.

3. In a storage battery wherein is provided a box, the walls of which are at right angles to one another, a battery plate terminal post extending above the box and having a flat side the plane of which lies at an angle of approximately 45° to the sides of the box, a bolt hole passing through the flat faced portion of the post, in combination with a cable terminal comprising a cable socket and a flat faced apertured extension, said extension projecting from the socket's axis to lie in a plane making an angle of approximately 45° with said axis, a bolt with nut passing through said post and said flat faced extension, said post having a bolt head receiving recess to hold the bolt against swivelling.

CHARLES E. HOOVER.